March 24, 1942.                H. J. LUFF                2,277,337
                          ADJUSTABLE BATH TRAP
                          Filed June 13, 1940
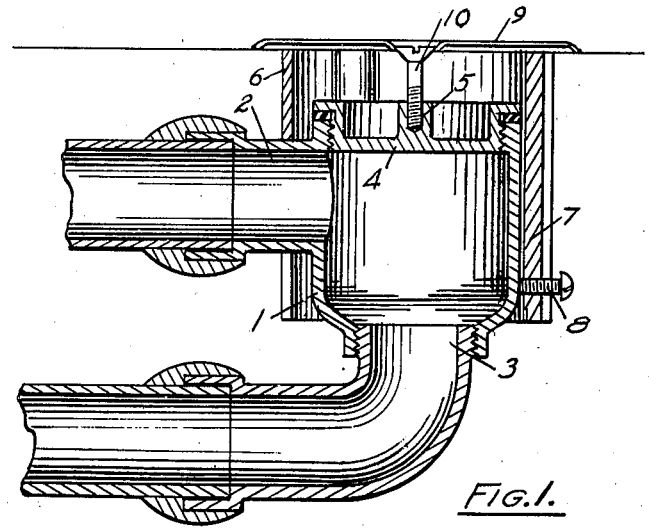
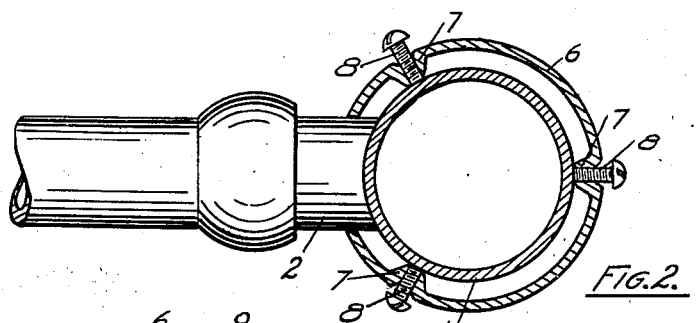
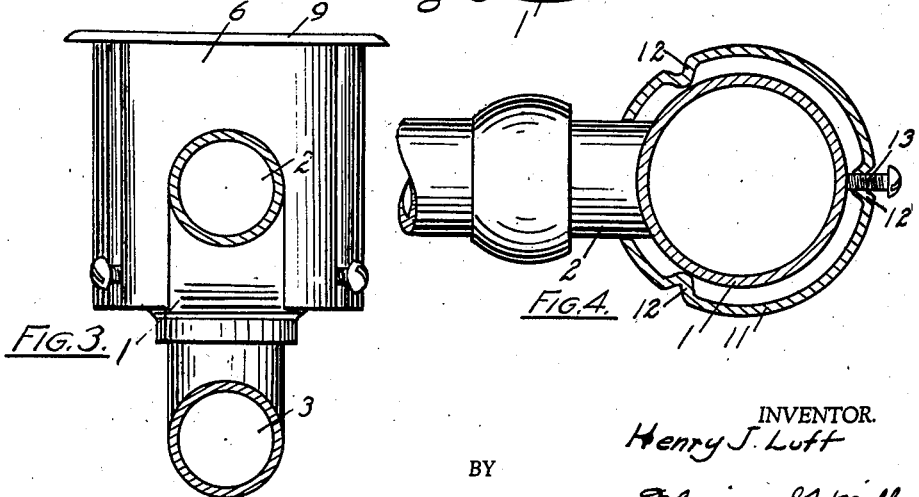
INVENTOR.
Henry J. Luff
BY
Florian D. Miller
ATTORNEY.

Patented Mar. 24, 1942

2,277,337

UNITED STATES PATENT OFFICE 2,277,337

ADJUSTABLE BATH TRAP

Henry J. Luff, Cleveland, Ohio, assignor to J. A. Zurn Manufacturing Company, Erie, Pa., a corporation of Pennsylvania Application June 13, 1940, Serial No. 340,310

2 Claims. (Cl. 182—24)

This invention relates generally to bath traps and more particularly to the cleanout opening and protective means therefor.

All bath traps made according to the teachings of the prior art and with which I am familiar, have the cleanout opening extended to a height where the discharge from the bath tube will not over-flow. These bath traps have been very hard to get at after they have been installed under the floor, and they are very difficult to install to the true level of the floor. It is customary to leave a hole in the concrete floor so as to be able to reach the trap for cleanout purposes. It is very difficult to form a hole of concrete around the body of a trap. These prior traps could be left loose to leak sewer air without indicating this defect by leak of water.

It is, therefore, an object of my invention to overcome the above and other defects in bath traps and more particularly, it is an object of my invention to provide an efficient cleanout and protective means, therefor, which is efficient and simple in construction, economical in cost, easy to install, and easy to reach after installation.

Another object of my invention is to provide a bath trap which indicates any possibility of leakage of sewer air by having the top of the cleanout opening as close as possible to the top of the waste outlet of the trap.

Another object of my invention is to provide a means for centering a handhole shield around the cleanout opening of the bath trap.

Another object of my invention is to provide protective and covering means for the cleanout opening of a bath trap which is adjustable vertically to provide for any height of concrete above the top of the trap.

Another object of my invention is to provide a cover for a cleanout opening for a trap which may be easily removed.

Another object of my invention is to provide an efficient and accessible means for cleaning a bath trap.

Other objects of my invention will become evident from the following detailed description taken in conjunction with the accompanying drawing, in which:

Fig. 1 is a side elevational view in section of a bath trap with my novel protective cover disposed therearound.

Fig. 2 is a plan view taken on the line 2—2 of Fig. 1.

Fig. 3 is the side elevational view of the bath trap shown in Fig. 1.

Referring to the drawing, Fig. 1 is a conventional form of bath trap having a cylindrical body portion 1 with an inlet 3 and outlet 2. A plug 4 having a threaded aperture 5 is threaded into the upper portion of the body 1 in order that the trap may be cleaned out at frequent intervals. A cylindrical handhole shield 6 surrounds the body 1 of the trap. Internal bosses 7 have a plurality of screw bolts 8 passing there-through to engage the side of the body 1. Three screw bolts 8 are shown in Fig. 2. It will be evident that the outer handhole shield 6 can be centered concentrically with respect to the cylindrical body 1 of the trap by means of adjusting the screw bolts 8 inwardly or outwardly. The protective shield 6 may be moved to any vertical position to conform to the height of a concrete floor under and in which the bath trap is installed. A cover 9 is secured to the plug 4 of the trap by screw bolt 10 disposed centrally thereof. The bottom of the cleanout plug 4 is on a line with the top of the waste outlet 2 from said bath trap and the extention of the trap body above the top of the waste outlet does not extend above the top of the cleanout plug.

In utilizing my invention, the trap is first installed in any desired position with the handhole shield 6 disposed around the body 1 of the trap as shown in Fig. 1. The shield 6 is then adjusted so that the upper end thereof is even with the surface of the proposed floor in and under which the trap is installed. The shield 6 is then secured to the body 1 of the trap by screw bolts 8. The shield 6 is disposed concentrically around the body 1 of the trap by means of the screw bolts 8. The concrete is then poured around the shield 6 and the cover 9 is then secured over the top of the trap by means of the centrally disposed screw bolts 10 threaded into the threaded aperture 5 of the plug 4. It will be evident that a perfectly formed handhole leading to the cleanout plug 4 is provided with the least amount of time and effort expended.

Fig. 4 shows a construction for a trap the same as in Fig. 1 with the exception of the outer shield 11 which has vertically extending bosses 12 with a screw bolt 13 disposed in only one of the bosses to secure the shield to the body of the trap.

Various changes may be made in the specific embodiment of my invention without departing from the spirit thereof or from the scope of the appended claims.

What I claim is:

1. In combination with a bath trap having a body and a cleanout plug in the top thereof disposed under a floor surface, the bottom of said cleanout plug being substantially on a line with the top of the waste outlet from said bath trap, a vertically adjustable shield surrounding said body to provide a passageway to said plug from the surface of said floor, means for disposing said shield concentric with respect to said body, and a removable cover disposed over said shield attached to said cleanout plug.

2. In combination with a bath trap having a body, a cleanout plug in the top thereof having a centrally disposed threaded aperture, a vertically adjustable shield surrounding said body to provide a passageway to said plug, screw means disposed around said shield for adjusting said shield to a concentric position with respect to said body and for securing said shield to said body, a removable cover disposed over said shield, and screw means engaging the threaded aperture in said cleanout plug for securing said cover on said shield.

HENRY J. LUFF.